3,772,312
OCTAHYDROPYRINDENES
Elmar Sturm, Arlesheim, Hans-Joerg Cellarius, Riehen, and Brigitta von Bredow, and Christian Vogel, Binningen, Switzerland, assignors to Ciba-Geigy Corporation, Ardsley, N.Y.
No Drawing. Filed Jan. 31, 1972, Ser. No. 222,285
Int. Cl. C07d 39/00
U.S. Cl. 260—293.54          11 Claims

ABSTRACT OF THE DISCLOSURE

Thio- and dithiocarbamates of octahydro-1-pyrindenes may be used as plant growth inhibitors and as weed-killers in crop cultures.

This invention relates to substituted octahydropyrindenes, a process for their manufacture and selective herbicidal agents which contain such substituted octahydropyrindenes as active substances. The invention also relates to processes for combating weeds and grass weeds using the new active substances or agents containing them.

The expression "octahydropyrindene" is used in the following specification and claims to denote a substituted 2-azabicyclo[4.3.0]-nonane (octahydro-1-pyrindene).

According to the present invention there is provided a substituted octahydropyrindene corresponding to Formula I:

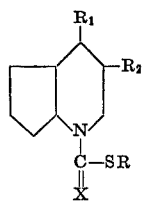

(I)

wherein R is an optionally halo substituted alkyl group containing 1 to 4 carbon atoms or an optionally halo substituted alkenyl group containing 3 to 4 carbon atoms, $R_1$ and $R_2$ are each hydrogen or one of them is methyl and the other is hydrogen and X is oxygen or sulphur.

As alkyl groups R there can be straight or branched chain groups such as the methyl-, ethyl-, n-propyl-, iso-propyl-, n-butyl-, sec.butyl-, and tert.butyl groups. The alkenyl groups R include the allyl-, 2-butenyl-, 3-butenyl and the methylallyl group. The term halogen embraces chlorine and bromine.

Preferred halo substituted alkyl and alkenyl groups with at most 4 carbon atoms are the 2-chloroethyl-, 3-chloro-n-propyl-, 2-chloroallyl- and 3-chloroallyl groups.

Compounds according to Formula I wherein X is oxygen possess a particularly favourable selectivity. Of these, those compounds in which R is an alkyl group having 1 to 4 carbon atoms, the 2-chloroethyl-, 3-chloropropyl-, allyl, methallyl, 2-chloroallyl or 3-chloroallyl group have particularly good herbicidal properties.

The substituted octahydropyrindenes of Formula I may be obtained according to the invention by reacting an oxy-hydropyrindene of Formula II:

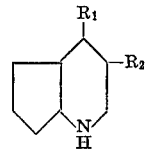

(II)

either with a thiocarbonic acid halide of the Formula III

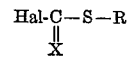

(III)

or with the components of such a halide, namely phosgene or thiophosgene and the alkali metal salt or a mercaptan of Formula IV

    (IV)

in the presence of an acid binding agent. In Formulae II to IV R, $R_1$ and $R_2$ have the meanings given under Formula I, and Hal in Formula III stands for chlorine or bromine. It is advisable to carry out the reactions in a solvent and/or diluent inert to the reactants. The type of extending agent used is determined substantially by the acid binding agent used in the reaction. If organic bases such as tertiary amines are used then it is advisable to use organic solvents as well. For inorganic bases, water and aqueous mixtures of organic solvents miscible with water are suitable. Generally the following tertiary amines can be used as acid binding agents: pyridine and pyridine bases, triethylamine, triethylene diamine etc. Likewise the octahydropyrindene of Formula II can be used in excess in the reaction as an acid binding agent. Of the inorganic bases there are the hydroxides and carbonates of the alkaline and alkaline earth metals, in the front rank sodium hydroxide, sodium carbonate, and potassium carbonate, and furthermore the hydroxide and carbonate of lithium, barium, strontium and magnesium, as well as quaternary ammonium compounds which react as bases in the presence of water, for example, tetramethylammonium hydroxide etc.

As solvents there can be used aliphatic and aromatic hydrocarbons and halohydrocarbons such as benzene, toluene, xylenes, petroleum ether, chlorobenzene, methylene chloride, chloroform, carbon tetrachloride, ether and ether like solvents such as dialkylether, tetrahydrofuran; as solvents miscible with water there are alkanols, ketones etc.

In the reaction of an octahydropyrindene of Formula II with phosgene or thiophosgene and an alkali metal salt of a mercaptan, the octahydropyrindene-1-carbonyl halide obtained as intermediate product can be reacted without further purification with an alkali salt of a mercaptan of Formula IV.

For the manufacture of the novel substituted octahydropyrindenes of Formula I wherein X is oxygen, a process is preferred in which an octahydropyrindene of Formula II is reacted in the presence of an acid binding agent with carbonylsulphide (COS) and then with an alkylating agent or alkenylating agent. As acid binding agent in this there are the bases noted above, preferably alkali metal hydroxides. As alkylating agents there are in the first rank alkyl halides and furthermore dialkylsulphuric acid esters and alkyl esters of aryl sulphonic acids (preferably toluene sulphonic acids) suitable, as alkenylating agents, above all, alkenyl halides and alkenyl tosylates.

For the manufacture of substituted octahydropyrindenes of Formula I in which X stands for sulphur, a similar process variant is preferred: an octahydropyrindene of Formula II is reacted in the presence of an inorganic or organic base with carbon disulphide and then with an alkylating agent or alkenylating agent.

The reactions described according to the invention of a substituted octahydropyrindene of Formula II with compounds of Formula III are preferably carried out at temperatures of from —20 to +100° C., most preferably between 0 and 30° C.

The octahydropyrindenes of Formula II are known compounds (see H. L. Lochte and A. G. Pittmann in J. Am. Chem. Soc. 82, 469 (1960)).

The new substituted octahydropyrindenes of Formula I possess exceptional herbicidal and plant regulatory properties, and some of them also possess fungicidal properties. The herbicidally active derivatives are partly useful as general herbicides and partly useful for combating weeds and grass weeds in crops including maize and furthermore in soya, cotton, sugar beet and rice cultures (both wet and dry rice cultures).

Weed types which are very difficult to combat in rice cultures are attacked by these active substances, for example in water rice cultures there are Echinochloa sp., Eleocharis sp., Monochoria, Sagittaria, Panicum sp., Cyperacea, Rotala, Lindernia, Vandellia, Paspalum sp., etc. In dry rice cultures there are likewise Echinochloa sp., Digitaria sp., Bracharia sp., Sida sp., Cyperacea, Acanthosperum sp., etc. Since the active substances gradually kill off the undesired plants and thus do not sharply adversely affect the biological equilibrium, they are very well suited for use in water rice cultures. Additionally the active substances possess a broad spectrum of activity against the most varied types of water weeds, e.g. against immersed plants, water plants with and without floating leaves, submerged plants, algae etc.

The broad spectrum of activity of the new substituted octahydropyrindenes of Formula I also allows them to be used for the important combating of weeds and grass weeds in the area surrounding the useful plant cultures such as trenches, canal beds, dams, etc. By these active substances not only the weeds arising in useful plant cultures which have already been noted are combated but also other grassy and broad-leaved weeds are destroyed. The active substances can be used in the preparation of the growth areas and also after the emergence of cultured plants for destroying any already emerged weed condition. The application rates are various and dependent upon the point of time of the application; they generally lie between 0.25 and 6, preferably 0.5 and 2 kg. of active substance per hectare in the case of application before the mergence of the plants. Application rates of 10 to 30 kg. active substance per hectare can be used for obtaining a total destruction of the entire weed population, for example on untilled land next to the cultured land.

Additionally such substituted octahydropyrindenes can also be used as growth regulating agents for example for defoliation, acceleration of blooming etc. With the new compounds the vegetative plant growth and the germination ability are influenced and bloom formation, fruit development and the construction of separating webs is encouraged. The generation of undesired economy drives in various plant types is very greatly diminished. The new compounds also act to promote secretions e.g. the latex flow in Hevea brasiliensis is encouraged. As experiments show, the rooting of seedlings and cuttings as well as tuber formation in potatoes is favourably influenced. The germination ability of seed goods such as e.g. seed potatoes and leguminous plants is encouraged at low concentrations but hindered at higher concentrations. Both the first and second effects are of economic value. For many ornamental and culture plants a control of the end of blooming and the number of blooms is possible. If all the sprays bloom at the same time then the harvesting of the sprays can take place within a comparatively short time.

Tests show further that with fruit trees a thinning out of the blooming and fruiting results. Furthermore, e.g. with apples, pears, peaches, tomatoes, bananas and pineapples the fruit ripening and fruit colouring is accelerated and improved. By the formation of separation webs, the fruit and leaf abscission is substantially eased. This is of great economic importance for mechanical harvesting, e.g. of citrus fruits or cotton.

Substituted octahydropyrindenes of Formula I have previously not been described. In United States patent specification 3,344,134 herbicidal azobicyclo (3.2.2)-nonanthiolcarbamates have indeed been described but their action on grass weeds is however small for good selectivity in culture plants and dicotyledonous weeds are not harmed. The active substances of Formula I according to the invention show a far better effectiveness against grass weeds and show a broader working spectrum against dicotyledonous weeds. Some, with good compatibility against crops, particularly maize and wheat and furthermore also soya, sugar beet and cotton, are themselves even at very low application rates, herbicidally active against a number of grassy weeds, against which the noted comparison compounds have no action or only insufficient action.

Some of the new substituted octahydropyrindenes of Formula I possess even at low concentrations below the application rates for herbicidal action an exceptional fungicidal action on phytopathogenic fungi. Thus, for example, true mildew moulds such as cucumber mildew (Erysiphe cichoriacearum), apple mildew (Podosphaera leucotricha), rose mildew (Sphaerotheca pannosa), wheat mildew (Erysiphe graminis) as well as false mildew fungi such as the generator of root and tuber rot in potatoes (Phytophthora infestans), the false beet mildew (Plasmophora viticola), and furthermore leaf spot generators such as the generator of the dry spot illness of tomatoes (Alternaria solani), the leaf spot illness of celery (Septoria spicola), and rust fungi such as bean rust (Uromyces appendiculatus), and furthermore the very difficult to combat grey horse (Botrytis cinerea) etc., are killed off by use of the new active substances or are restricted in their growth. The compounds possess, apart from an exceptional long term action, also a good curative action whereby even moulds already impregnated into the plant tissues are killed off after use of the new compounds.

For the manufacture of herbicidal agents the active substances are mixed with suitable carriers and/or distribution agents. For broadening the spectrum of activity other herbicides can be added to these agents, for example, selected from s-triazines such as 2-halo-4,6-diamino-s-triazines or 2-alkoxy- or 2-alkylthio-4,6-diamino-s-triazines, or selected from triazoles or diazines such as uracils, aliphatic carboxylic acids or halocarboxylic acids, halogenated benzoic acids and phenyl acetic acids, also from phenoxyalkanecarboxylic acids, hydrazides, amides e.g. substituted anilides, nitriles, phenylureas, carbamic acid esters or thiocarbamic acid esters.

The following examples illustrates the process of manufacture of the new substituted octahydropyrindenes of Formula I. Temperatures are given in degrees centigrade throughout.

EXAMPLE 1

188 g. octahydro-1-pyrindene was dissolved in 1000 ml. diethylether and a lower stratum was then formed with a solution of 84 g. potassium hydroxide in 500 ml. water. To this mixture there was added dropwise with vigorous agitation and cooling (5 to 10°) 187 g. chlorothioformic acid-S-ethylester. After the end of the reaction the mixture was stirred for a further 30 minutes, the phases then separated and the organic phase washed neutral with water, dried and the ether evaporated in vacuo. The remaining oil was distilled in vacuo. There was obtained 281 g. 1(ethylthiocarbonyl)octahydro-1-pyrindene as a colourless oil of boiling point 108 to 112°/0.4 torr. (Compound No. 1.)

EXAMPLE 2

Operating as in Example 1 40.5 g. octahydro-1-pyrindene were used in 200 ml. petroleum ether and 13 g. sodium hydroxide in 100 ml. water with 32 g. phosgene added with stirring and cooling to —5 to 0°, then after treating the organic phase there was obtained the octahydro-1-pyrindene-N-carboxy chloride. The reaction of this intermediate product in petroleum ether with an aqueous solution of 27 g. sodium ethyl mercaptide gave after treatment of the organic phase, 55 g. of colourless oil, the physical constance of which agreed with those of the product of Example 1.

EXAMPLE 3

To a solution of 16 g. octahydro-1-pyridine and 13 g. triethylamine in 200 ml. benzene, there was added dropwise with stirring and cooling slowly 17.7 g. chlorothioformic acid-S-n-propylester. After the end of the reaction the mixture was stirred for a further 3 hours at room temperature and the reaction solution separated from the precipitated triethylammonium chloride by filtration and the benzene evaporation in vacuo. The resulting yellowish oil was distilled in vacuo. 22 g. of 1-(n-propylthiocarbonyl)-octahydro-1-pyrindene was obtained as a colourless oil of boiling point 100 to 110°/0.01 to 0.02 torr. (Compound No. 2.)

EXAMPLE 4

12.2 g. carbonyl sulphide were fed with slow stirring at 0 to 5° into a solution of 25 g. octahydro-1-pyrindene and 8 g. sodium hydroxide in 400 ml. 50% aqueous ethanol. Half an hour after the reaction had ended 27.5 g. n-butylbromide were rapidly added thereto dropwise and the mixture stirred for a further 5 hours at 25°. The alcohol was removed in vacuo and the oil formed taken up in methylene chloride. After drying and distilling away the solvent, the yellow oil was distilled in vacuum. 27 g. 1-(n-butylthio-carbonyl)-octahydro-1-pyrindene was obtained as a colourless oil of boiling point 125 to 128°/0.1 torr. (Compound No. 3.)

EXAMPLE 5

To a solution of 12.5 g. octahydro-1-pyrindene and 4 g. sodium hydroxide in 150 ml. 50% aqueous ethanol there was added dropwise at 0 to 5° a solution of 7.6 g. carbon disulphide in 50 ml. ethanol. After an hours subsequent stirring at 0° to 5° 8 g. allyl chloride was added to the mixture and it was stirred for a further 20 hours at 25°. The mixture was then diluted with water and the separated oil extracted with ether. After drying the ether was evaporated in vacuo and the remaining yellowish oil dried under high vacuum (18 g.). The 1-(allylthio-thiocarbonyl)-octahydro-1-pyrindene formed had a refractive index $n_D^{20}$=1.6092. (Compound No. 4.)

The compounds of Formula I set forth in the following Table I were manufactured using the method described in these examples with the use of corresponding quantities of octahydropyrindene and thiocarbonic acid halide of Formula II or carbonyl sulphide or carbon disulphide and alkenylating agent.

TABLE I

| Compound Number | Compounds | Melting point, boiling point or refractive index |
|---|---|---|
| 5 | 1-(methylthio-carbonyl)-octahydro-1-pyrindene. | 94°/0.1 torr. |
| 6 | 1-(isopropylthio-carbonyl)-octahydro-1-pyrindene. | 100°/0.1 torr. |
| 7 | 1-(sec. butylthio-carbonyl)-octahydro-1-pyrindene. | 115–118°/0.5 torr. |
| 8 | 1-(tert-butylthio-carbonyl)-octahydro-1-pyrindene. | 110°/0.5 torr. |
| 9 | 1-(2-chlorethylthio-carbonyl)-octahydro-1-pyrindene. | 125–135°/0.03 torr. |
| 10 | 1-(3-chloropropylthio-carbonyl)-octahydro-1-pyrindene. | 170–180°/0.01 torr. |
| 11 | 1-(allylthio-carbonyl)-octahydro-1-pyrindene. | 105–108°/0.05 torr. |
| 12 | 1-(methallylthio-carbonyl)-octahydro-1-pyrindene. | 113–116°/0.03 torr. |
| 13 | 1-(ethylthio-carbonyl)-3-methyl-octahydro-1-pyrindene. | 94°/0.12 torr. |
| 14 | 1-(n-propylthio-carbonyl)-3-methyl-octahydro-1-pyrindene. | 107°/0.17 torr. |
| 15 | 1-(ethylthio-carbonyl)-4-methyl-octahydro-1-pyrindene. | 115–118°/0.07 torr. |
| 16 | 1-(isopropylthio-carbonyl)-4-methyl-octahydro-1-pyrindene. | 96–100°/0.1 torr. |
| 17 | 1-(methylthio-thiocarbonyl)-octahydro-pyrindene. | M.P. 44–48°. |
| 18 | 1-(ethylthio-thiocarbonyl)-octahydro-1-pyrindene. | 135–145°/0.005 torr. |
| 19 | 1-(isopropylthio-thiocarbonyl)-octahydro-1-pyrindene. | $n_D^{20}$=1.5925. |
| 20 | 1-(n-butylthio-thiocarbonyl)-octahydro-1-pryindene. | $n_D^{20}$=1.5842. |
| 21 | 1-(2-chlorallylthio-thiocarbonyl)-octahydro-1-pyrindene. | $n_D^{20}$=1.6133. |
| 22 | 1-(3-cis-chloroallylthio-thiocarbonyl)-octahydro-1-pyrindene. | $n_D^{20}$=1.6203. |
| 23 | 1-(3-trans-chlorallylthio-thio-carbonyl)-octahydro-1-pyrindene. | $n_D^{20}$=1.6205. |
| 24 | 1-(allylthio-thiocarbonyl)-3-methyl-octahydro-1-pyrindene. | $n_D^{20}$=1.5974. |
| 25 | 1-(allylthio-thiocarbonyl)-4-methyl-octahydro-1-pyrindene. | $n_D^{20}$=1.5988. |

The herbicidal action of the new compounds was demonstrated by the following tests.

(I) Pre-emergence test

The active substance was worked in at a 10% powder concentrate to a concentration of 16 g. active substance per hectare in earth. The so prepared earth was filled into seed boxes wherein the following test plants were sown: Millet (*Setaria italica*), mustard (*Sinapis alba*), oats (*Avena sativa*), rye grass (*Lolium perenne*) and vetch (*Vicia sativa*).

The trays were then kept in a greenhouse at 20 to 24° C. and 70% relative humidity under daylight.

Evaluation of the test took place after 20 days and was reckoned according to a scale of 9.

9=Plants undamaged=Control
1=Plants killed
8–2=Intermediate stages of damage
—=not tested.

TABLE II

| Active substance Cpd. No. | Millet (*Setaria italica*) | Mustard (*Sinapis alba*) | Oats (*Avena sativa*) | Rye grass (*Lolium perenne*) | Vetch (*Vicia sativa*) |
|---|---|---|---|---|---|
| 1 | 1 | 2 | 1 | 1 | 2 |
| 2 | 1 | 2 | 1 | 1 | 2 |
| 3 | 2 | 6 | 2 | 1 | |
| 6 | 1 | 5 | 1 | 1 | |
| 13 | 1 | 3 | 1 | 1 | |
| 14 | 1 | 2 | 2 | 1 | |

The 10% powder concentrate had the following composition.

| | Parts |
|---|---|
| Active substance | 10 |
| Dibutyl naphthaline sulphonic acid sodium salt | 0.6 |
| Naphthaline sulphonic acid phenol sulphonic acid formaldehyde condensate (3:2:1) | 1 |
| Sodium aluminum silicate | 10 |
| Kaolin | 78.4 |

(II) Selective pre-emergence test with sown test plants

Directly after the sowing of the test plants in seed trays, the active substances were applied to the earth surface as aqueous suspensions made up from a 25% wettable powder. The seed trays were then kept at 22 to 25° C. and 50 to 70% relative humidity under daylight.

Evaluation took place after 28 days according to the above noted scale of 9. As test plants there were sown:

Useful plants:

Wheat (*Triticum vulgare*)
    Soya (*Glycine max.*)
    Cotton (*Gossypium hirsutum*)
    Maize (*Zea mays*)
    Rice (*Oryza sativa*)
    Sugar beet (*Beta vulgaris*)

Weeds:

*Echinochloa crus galli*
        (a) dry
        (b) in water
    *Poa trivialis*
    *Alopecurus myosuriodes*
    *Digitaria sanguinalis*
    *Amaranthus spez.*
    *Lolium multiflorum*
    *Setaria italica*

TABLE III.—SELECTIVE TESTS CONDITION OF SOWN PLANTS AFTER 4 WEEKS

| Active substance No. | Conc. kg./ha. | Culture plants | | | Weeds | | | | | | | |
|---|---|---|---|---|---|---|---|---|---|---|---|---|
| | | Wheat | Soya | Cotton | Echinochloa crus galli | | Poa trivialis | Alope-curus | Digitaria | Aman-anthus | Lolium | Setaria |
| | | | | | Dry | In water | | | | | | |
| 1 | 4 | | 7 | 6 | 1 | 1 | 1 | 2 | 1 | 1 | 1 | 1 |
|  | 2 | | 7 | 7 | 1 | 1 | 1 | 3 | 1 | 3 | 2 | 2 |
|  | 1 | | 7 | 9 | 2 | 2 | 1 | 3 | 8 | 5 | 2 | 2 |
| 2 | 4 | 8 | 8 | 4 | 1 | 2 | 1 | 1 | 2 | 2 | 1 | 2 |
|  | 2 | 8 | 8 | 9 | 1 | 2 | 1 | 2 | 3 | 3 | 1 | 2 |
|  | 1 | 9 | 9 | 8 | 7 | 6 | 3 | 7 | 5 | 3 | 2 | 3 |
| 3 | 4 | 9 | | | 7 | 2 | 2 | 1 | 2 | 1 | 1 | 1 | 1 |
|  | 2 | 9 | | | 8 | 2 | 2 | 1 | 2 | 2 | 2 | 1 | 2 |
|  | 1 | 9 | | | 9 | 2 | 5 | 1 | 6 | 4 | 4 | 1 | 3 |

| | Conc. kg./ha. | Culture plants | | | | | | Weeds | | | | | | |
|---|---|---|---|---|---|---|---|---|---|---|---|---|---|---|
| | | Wheat | Soya | Cotton | Maize | Water rice | Dry rice | Sugar beet | Echinochloa crus galli | | Poa trivialis | Alope-curus | Digi-taria | Amar-anthus | Lolium | Set-aria |
| | | | | | | | | | Dry | In water | | | | | | |
| 6 | 4 | 9 | 3 | 7 | 8 | | | 9 | 1 | 1 | 1 | 2 | 1 | 1 | 1 | 1 |
|  | 2 | 9 | 8 | 9 | 8 | | | 9 | 2 | 1 | 1 | 2 | 1 | 3 | 2 | 2 |
|  | 1 | 9 | 8 | 9 | 9 | | | 9 | 2 | 1 | 2 | 6 | 2 | 7 | 2 | 6 |
| 7 | 4 | 5 | 8 | 7 | 9 | 3 | 3 | 8 | 2 | 1 | 3 | 2 | 1 | 3 | 4 | 1 |
|  | 2 | 7 | 8 | 8 | 9 | 6 | 8 | 8 | 2 | 2 | 3 | 3 | 2 | 3 | 5 | 2 |
|  | 1 | 8 | 9 | 9 | 9 | 7 | 9 | 8 | 2 | 2 | 4 | 6 | 7 | 4 | 8 | 4 |
| 10 | 4 | 8 | 8 | 7 | 9 | 9 | 9 | 9 | 2 | 2 | 3 | | 2 | 1 | 3 | 2 |
|  | 2 | 9 | 9 | 8 | 9 | 9 | 9 | 9 | 2 | 2 | 3 | | 2 | 3 | 3 | 2 |
|  | 1 | 9 | 9 | 9 | 9 | 9 | 9 | 9 | 2 | 2 | 3 | | 2 | 3 | 2 | 2 |
| A | 4 | 9 | 9 | 9 | 9 | | | | 3 | 1 | 4 | 6 | 2 | 4 | 3 | 3 |
|  | 2 | 9 | 9 | 9 | 9 | | | | 6 | 7 | 8 | 6 | 3 | 6 | 9 | 4 |
|  | 1 | 9 | 9 | 9 | 9 | | | | 7 | 9 | 9 | 9 | 9 | 9 | 9 | 9 |

A=3-(ethylthio-carbonyl)-3-azabicyclo-[3.2.2.]-nonane (known from U.S. Pat. specification No. 3,344,134).

(III) The following tests show the restricting influence on the length growth of various plant types:

(A) Use on grasses.—A lawn mixture consisting of Lolium perenne (20%) Foa pratensis (23%), Agrostis tenuis (10%) and Festuca rubra (47%), was cultivated for 4 months in seed trays and cut once weekly. The freshly cut about 1.5 cm. high lawn was then treated with an aqueous or aqueous acetonic solution of active substance. Thereafter the lawn was kept at 25° and 65% relative humidity under 15,000 lux. 4 weeks after the application of the active substance, the length growth was inspected.

In the following Table IV the diminution in the length growth which was generated by the active substance at various application rates is given according to the following evaluation key:

6=no action, like untreated lawn
5=about 15% inhibition of the length growth
4=about 35% inhibition of the length grown
3=about 50% inhibition of the length growth
1=maximum inhibition
C=deeper green colouring of the leaves
N=light edge necroses of the leaves

TABLE IV

| Active substance Compound No. | Lolium perenne | Poa pratensis | Agrostis tenuis | Festuca rubra |
|---|---|---|---|---|
| 1 | 4C | 4C | 4C | 4 |
| 2 | 4C | 4C | 4C | 4C |

(B) Use on crops.—Various crops (spring wheat, rye and oats) were cultivated in seed trays. When the plants had reached the two-leaf stage, they were (a) sprayed to dripping wetness with an aqueous or aqueous acetonic 0.5% or 0.1% respectively solution of active substance and then kept in a climate chamber at 25° and 65% relative humidity under 15,000 lux. After 21 days the diminution in length growth of the plants was determined by measuring the internode distance.

(b) so dipped into an aqueous or aqueous acetonic treatment liquid at the given active substance concentration that the above earth parts of the plants remained untouched. The plants were then further kept in the climate chamber under the conditions noted above. 4 weeks after application the length growth was determined and evaluated in the same fashion as under (a).

TABLE V

| Active substance Compound No. | Concentration, percent | (a) Leaf-application | | |
|---|---|---|---|---|
| | | Spring wheat | Rye | Oats |
| 2 | 0.5 | 3 | 3N | 3 |
|  | 0.1 | 3 | 3 | 3 |
| | | (b) Leaf-application | | |
| 1 | 0.5 | 5 | 3 | 3 |
|  | 0.1 | 5 | 4 | 3 |

The other substances were tested in the same fashion and showed similar action.

The manufacture of herbicidal agents according to the invention takes place by intimate mixing and milling of active substances of General Formula I with suitable carrier materials, optionally with the addition of dispersing agents or solvents inert with respect to the active substance. The active substances can be present and can be used in the following use forms:

Solid use forms: dusting agents, spreading agents, granulates, coated granulates, impregnated granulates, and homogeneous granulates;

Active substance concentrates dispersible in water; wettable powders, pastes, emulsions;

Liquid use forms: solutions.

For the manufacture of solid use forms (dusting agents, spreading agents, granulates) the active substances are mixed with the solid carriers. As carrier materials, there are for example, kaolin, talcum, bolus, loess, chalk, limestone, limestone grit, dolomite, diatomaceous earth, precipitated silicic acid, alkaline earth silicates, sodium and potassium aluminium silicates (feldspars and mica), calcium and magnesium sulphates, ground plastics materials, fertilisers such as ammonium sulphate, ammonium phosphate, ammonium nitrate, ureas, ground vegetable products such as crop flours, bark flour, wood flour, nutshell flour, cellulose powder, residues of plant extractions, active carbon etc., each used alone or as mixtures with one another.

The particle size of the carrier material for dusting agents suitably amounts to about 0.1 mm., for spreading agents about 0.075 to 0.2 mm. and for granulates 0.2 mm. or more.

The concentrations of active substance in the solid application forms amount to 0.5 to 80%.

There can furthermore be added to these mixtures additives stabilising the active substance and/or nonionic, anion active or cation active materials, which for example, improve the adherence of the active substances to plants and plant parts (adhesives and glues) and/or guarantee a better wettability (wetting agents) as well as dispersability (dispersing agents). As adhesives there are, for example, the following: olein-lime mixtures, cellulose derivatives (methyl cellulose); hydroxyethylglycolethers of mono- and dialkylphenols with 1 to 15 ethylene oxide groups per molecule with 8 to 9 carbon atoms in the alkyl group, ligninsulphonic acids, their alkali- and alkaline earth salts, polyethyleneglycolethers (Carbowaxes), fatty alcohol polyethylene glycol ethers with 5 to 20 ethylene oxide groups per molecule and 8 to 18 carbon atoms in the fatty alcohol part, condensation products of ethylene oxide, propylene oxide, polyvinylpyrrolidones, polyvinyl alcohols, condensation products of urea formaldehyde as well as latex products.

Concentrates of active substance dispersible in water, i.e. sprayable powders, pastes and emulsion concentrates are materials which can be diluted with water to any desired concentration. They consist of active substance, carrier material, optionally additives stabilising the active substance, surface active substances and anti-foaming agents and optionally solvents. The active substance concentration in these materials amounts to 5 to 80%.

The wettable powders and pastes are obtained by mixing and milling together the active substances with dispersing agents and powder form carrier materials in suitable apparatus until homogeneity. As carrier materials there are, for example, those mentioned previously for the solid application forms. In some cases it is advantageous to use mixtures of different carrier materials. As dispersing agents there can be used for example: condensation products of sulphonated naphthalene and sulphonated naphthalene derivatives with formaldehyde, condensation products of naphthalene or naphthalene sulphonic acids with phenol and formaldehyde as well as alkali, ammonium and alkaline earth salts of ligninsulphonic acids, furthermore alkylaryl sulphonates, alkaline and alkaline earth metal salts of dibutylnaphthaline sulphonic acid, fatty alcohol sulphates, such as salts of sulphated hexadecanols, heptadecanols, octadecanols, and salts of sulphated fatty alcohol glycolethers, the sodium salt of oelylethionate, the sodium salt of oleylmethyltauride, ditertiary acetyleneglycols, dialkyldilauryl ammonium chloride and fatty acid alkaline and alkaline earth salts.

As anti-foaming agents there are for example silicones.

The active substances are so mixed, milled, sieved and checked with the above noted additives, that in the sprayable powders the solid portion has a particle size of 0.02 to 0.04 mm. and in pastes one not exceeding 0.03 mm. For the manufacture of emulsion concentrates and pastes dispersing agents, such as are set forth in the preceding paragraphs, organic solvents and water are used. As solvents, there are for example, the following: alcohols, benzene, xylenes, toluene, dimethylsulphoxide, and mineral oil fractions boiling in the range of 120 to 350° C. The solvents must be practically odorless, non-phytotoxic, inert with respect to the active substances and not easily inflammable.

Furthermore, the agents according to the invention can be used in the form of solutions. For this, the active substance or several active substances of General Formula I are dissolved in suitable organic solvents, solvent mixtures, or water. As organic solvents, there can be used aliphatic and aromatic hydrocarbons, their chlorinated derivatives, alkyl naphthalines, mineral oils alone or as mixtures with one another. The solvents should contain the active substances in a concentration range of from 1 to 20%.

Other biocidally active substances or agents can be mixed together with the agents described according to the invention. Thus, the new agents can contain, apart from the noted compounds of Formula I for example, insecticides, fungicides, bactericides, fungistatic agents, bacteriostatic agents, or nematocides for broadening the spectrum of action. The agents according to the invention can further contain plant fertilizers, trace elements etc.

In the following, application forms of the new substituted octahydropyrindenes are described. Parts are parts by weight:

Granulate.—For the manufacture of a 5% granulate the following materials are used:

5 parts of an active substance of Formula I,
0.25 part epichlorohydrin,
0.25 part cetylpolyglycolether,
3.50 parts polymethyleneglycol ethers (Carbowax),
91 parts kaolin (particle size 0.3–0.8 mm.).

The active substance is mixed with epichlorohydrin and dissolved in 6 parts acetone whereon the polyethyleneglycol ether and cetylpolyglycol ether are added thereto. The solution so obtained is sprayed onto kaolin and the solvent then evaporated in vacuo.

Sprayable powder.—For the manufacture of an (a) 70%, (b) 25% and (c) 10% sprayable powder, the following components were used:

(a)

70 parts of an active substance of Formula I,
5 parts sodium dibutylnaphthylsulphonate,
3 parts naphthalinesulfonic acids-phenolsulphonic acids-formaldehyde condensate 3:2:1,
10 parts kaolin,
12 parts champagne-chalk;

(b)

25 parts of an active substance of Formula I,
5 parts oleylmethyltauride sodium salt,
2.5 parts naphthaline sulphonic acid formaldehyde condensate,
0.5 part carboxymethylcellulose,
5 parts neutral potassium aluminium silicate,
62 parts kaolin;

(c)

10 parts of an active substance of Formula I,
3 parts mixtures of sodium salts of saturated fatty alcohol sulphates,
5 parts naphthaline sulphonic acids formaldehyde condensate,
82 parts kaolin.

The active substance given was applied to the corresponding carrier materials (kaolin and chalk) and then mixed and milled. Sprayable powders were obtained of exceptional wettability and suspensionability. From such sprayable powders suspensions of any desired active substance concentration can be obtained by dilution with water.

Paste.—For a manufacture of a 45% paste, the following materials were used:

45 parts of an active substance of Formula I,
5 parts sodium aluminium silicate,
14 parts cetylpolyglycolether with 8 mol ethylene oxide,
1 part oleylpolyglycolether with 5 mol ethylene oxide,
2 parts spindle oil,
10 parts polyethylene glycol,
23 parts water.

The active substance was intimately mixed and milled with the active materials in suitable apparatus. A paste was obtained from which suspensions of any desired concentration could be manufactured by dilution with water.

Emulsion concentrate.—For the manufacture of a 10% emulsion concentrate:

10 parts of an active substance of Formula I,
15 parts oleylpolyglycolether with 8 mol ethylene oxide,
75 parts isophorone were mixed together. This concentrate can be diluted with water to, for example, a 0.1% emulsion. Such emulsions can be applied for example, before the emergence of maize, soya, cotton, wheat, dry rice, oats, barley, rye, sugar beet, potatoes, and other culture plants.

We claim:
1. An octahydropyrindene of the formula:

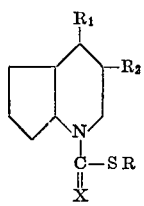

wherein

R represents an unsubstituted chlorosubstituted or bromo-substituted $C_1$ to $C_4$ alkyl group or an unsubstituted chlorosubstituted or bromo-substituted $C_3$ or $C_4$ alkenyl group;

$R_1$ and $R_2$ either both represent a hydrogen atom or one represents a hydrogen atom and the other represents a methyl group; and X is an oxygen or sulphur atom.

2. An octahydropyrindene according to claim 1 wherein X is an oxygen atom.
3. An octahydropyrindene according to claim 2 wherein R is an unsubstituted $C_1$ to $C_4$ alkyl, 2-chloroethyl, 3-chloropropyl, allyl, methallyl, 2-chloroallyl or 3-chloroallyl group.
4. 1-ethylthiocarbonyl)-octahydro-1-pyrindene.
5. 1-(n-propylthiocarbonyl)-octahydro-1-pyrindene.
6. 1-(n-butylthiocarbonyl)-octahydro-1-pyrindene.
7. 1-(isopropylthiocarbonyl)-octahydro-1-pyrindene.
8. 1-(sec.butylthiocarbonyl)-octahydro-1-pyrindene.
9. 1-(3-chloropropylthiocarbonyl) - octahydro-1-pyrindene.
10. 1 - (ethylthiocarbonyl) - 3 - methyl-octahydro-1-pyrindene.
11. 1-(n-propylthiocarbonyl) - 3 - methyl-octahydro-1-pyrindene.

References Cited
UNITED STATES PATENTS
3,679,686   7/1972   Hermans et al. _____ 260—287 R HENRY R. JILES, Primary Examiner
G. T. TODD, Assistant Examiner U.S. Cl. X.R.
71—94; 424—267